(12) United States Patent
Ankisettipalli et al.

(10) Patent No.: US 9,218,677 B2
(45) Date of Patent: Dec. 22, 2015

(54) PRESENTING DATA RECORDS BASED ON BINNING AND RANDOMIZATION

(71) Applicants: Anil Babu Ankisettipalli, Bangalore (IN); Arindam Bhattacharjee, Bangalore (IN); Shipra Chaudhary, Sikar (IN); Ashok Kumar Kn, Bangalore (IN); John MacGregor, Ascot (GB)

(72) Inventors: Anil Babu Ankisettipalli, Bangalore (IN); Arindam Bhattacharjee, Bangalore (IN); Shipra Chaudhary, Sikar (IN); Ashok Kumar Kn, Bangalore (IN); John MacGregor, Ascot (GB)

(73) Assignee: Business Objects Software Limited, Dublin (IE)

( * ) Notice: Subject to any disclaimer, the term of this patent is extended or adjusted under 35 U.S.C. 154(b) by 490 days.

(21) Appl. No.: 13/670,436

(22) Filed: Nov. 6, 2012

(65) Prior Publication Data

US 2014/0125673 A1 May 8, 2014

(51) Int. Cl.
*G06T 11/20* (2006.01)
(52) U.S. Cl.
CPC .................................. *G06T 11/206* (2013.01)
(58) Field of Classification Search
None
See application file for complete search history.

(56) References Cited

U.S. PATENT DOCUMENTS

| | | | | |
|---|---|---|---|---|
| 6,301,579 | B1* | 10/2001 | Becker | 707/999.102 |
| 7,216,116 | B1* | 5/2007 | Nilsson et al. | 707/999.003 |
| 2006/0221077 | A1* | 10/2006 | Wright et al. | 345/428 |
| 2009/0327342 | A1* | 12/2009 | Xiao | G06F 17/30241 1/1 |

OTHER PUBLICATIONS

Ming C. Hao, Umeshwar Dayal, Ratnesh K. Sharma, Daniel A. Keim, Halldór Janetzko; Visual Analytics of Large Multi-Dimensional Data Using Variable Binned Scatter Plots; Proceedings of Visualization and data analysis, vol. 7530, Jan. 18, 2010; p. 1-11; SPIE, Washington, USA; (http://kops.ub.uni-konstanz.de/bitstream/handle/urn:nbn:de:bsz:352-opus-124567/12456.
pdf?sequence=1%20and%20http://bib.dbvis.de/uploadedFiles/300.pdf).

* cited by examiner

*Primary Examiner* — Maurice L McDowell, Jr.
*Assistant Examiner* — Donna J Ricks (57) ABSTRACT

In one embodiment, data records associated with attributes are received. A check is made to determine whether the data records are greater than a maximum data record limit of a graph. Further, when the maximum number of data records in the bin is less than or equal to the maximum data record limit of the graph, the data records are retrieved and presented in the graph. When the data records are greater than the maximum data record limit of the graph, the data records are grouped into bins based on initial bin sizes corresponding to the plurality of attributes. Furthermore, weighted densities of the bins are determined using a maximum number of data records associated with a bin and a maximum data record limit of the bin. Further, the graph is rendered to present the weighted densities of the bins using a randomization technique to analyze the data records.

20 Claims, 6 Drawing Sheets

PRESENTING DATA RECORDS BASED ON BINNING AND RANDOMIZATION

FIELD

Embodiments generally relate to data presentation and more particularly to methods and systems to present data in a visual form.

BACKGROUND

Data presentation, such as data presentation in a graphical user interface (GUI) on a display device of a computer system, facilitates a user in understanding and interpreting the data. Today's visualization technology includes visualization techniques where resolution limits the volume of data that can be viewed and the types of views that can be achieved. However, it may not be feasible to legibly present a large volume of data records on the GUI.

Furthermore, current data visualization techniques require the data records to be stored locally in the computer system in order to plot them with suitable graphical representations such as scatter graph, lattice chart, bar graphs and the like. However, storing data records locally in the computer system in cases where data records are in large volume, hampers the performance of the computer system in terms of memory and processing time complexity.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques to present data records based on binning and randomization are described herein. According to various embodiments, the data records can be stored in a database associated with one or more business objects. Further, the data records may be associated with a plurality of attributes. The data records can be, but are not limited to, alphabets, numbers, special characters and any combination thereof. According to one embodiment, an approach for mining large databases is achieved. In this regard, the data records are grouped into bins, weighted densities of the bins are determined and then determined weighted densities are presented in a graph (e.g., on computer generated graphical user interface (GUI)) using a randomization technique. Further, a user can drill down the graph by selecting desired bins to visualize the data records. Since the weighted densities of the bins are presented using the randomization technique, the data record points are plotted on the GUI without fetching the entire data set locally, but the data records are fetched on the fly as per user's analysis perspective viewpoint. Therefore, the complexity to visualize large data records is reduced by reducing requirement of memory space and processing time.

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
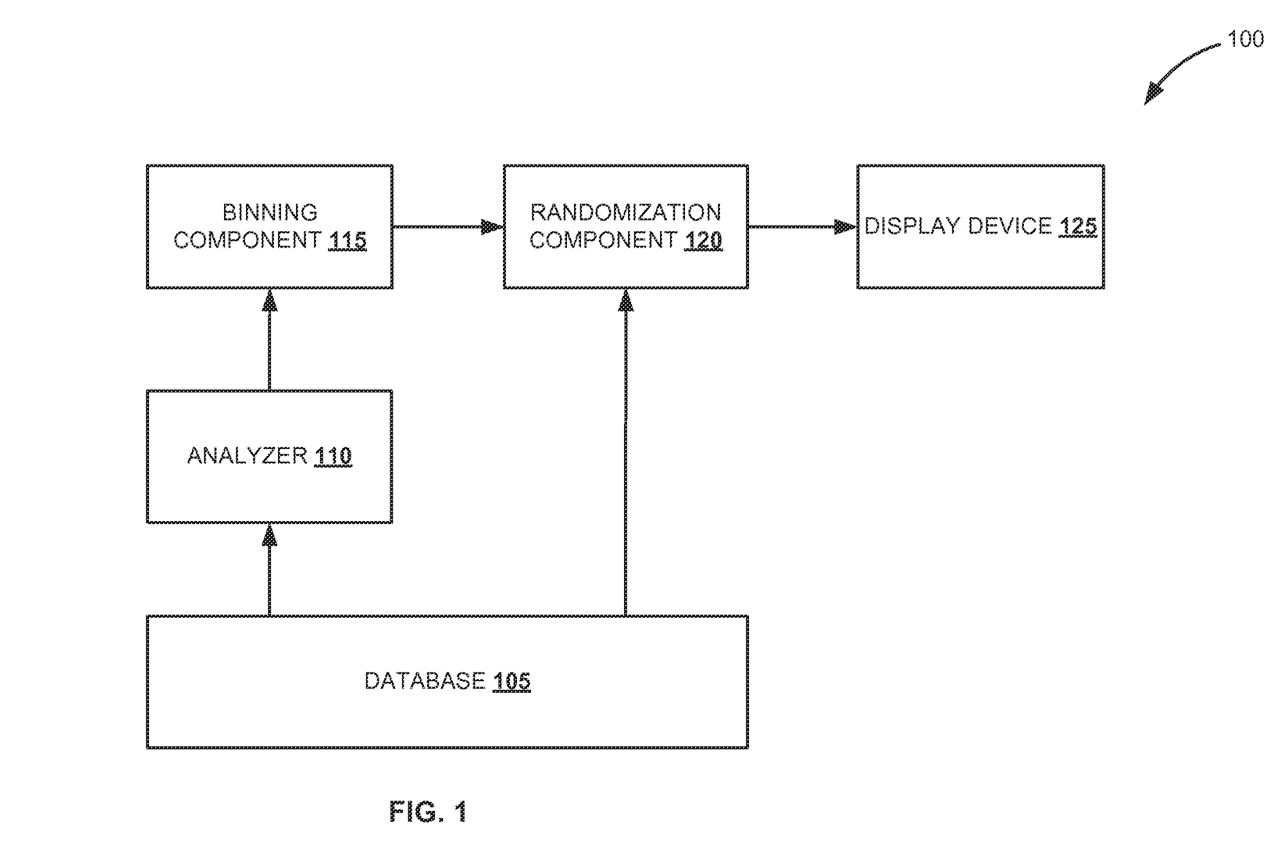
FIG. 1 is a block diagram illustrating a method to present data records, according to an embodiment.

FIG. 1 is a block diagram 100 illustrating a method to present data records, according to an embodiment. The block diagram 100 includes a database 105 storing the data records associated with one or more business objects. In one exemplary embodiment, the database 105 can be an in-memory database, where data records are stored in main physical memory of a computer system to provide high speed access to the data records, or a conventional database, where data records are stored using a disk storage mechanism. According to one embodiment, the data records in the database 105 are presented on a display device 125 using an analyzer 110, a binning component 115 and a randomization component 120. Further, the way in which the data records are presented on the display device 125 is based on a density of the data records.

In one embodiment, the way in which the data records are presented is determined by a factor (e.g., a maximum data record limit of a graph, resolution limit). The maximum data record limit of the graph defines an upper limit on the number of data records that can be legibly presented in the graph for a given resolution. In one exemplary embodiment, the maximum data record limit of the graph is provided by a user based on whether the user desires to view a high level view of the data records or a granular view of the data records. In another exemplary embodiment, the maximum data record limit of the graph can be automatically determined based on the screen (e.g., graphical user interface (GUI)) resolution of the display device 125. Further, the graph is a visual representation of the relations between attributes, which are associated with the data records, plotted with reference to a set of axes. For example, the graph can be, but is not limited to, a scatter graph, a bubble plot, a line chart, a radar chart and a tree map.

In one embodiment, when the data records are less than or equal to the maximum data record limit of the graph, the data records are plotted on the GUI of the display device 125. However, when the data records are greater than the maximum data record limit of the graph, then the data records are binned, weighted densities of the bins are determined and the determined weighted densities are presented using a randomization technique. In one embodiment, the analyzer 110 determines whether the data records are greater than the maximum data record limit of the graph.

In one embodiment, the binning component 115 groups the data records into one or more bins based on initial bin sizes corresponding to the plurality of attributes, when the data records are greater than the maximum data record limit of the graph. The initial bin sizes define a number of data records in each bin. Further, the binning component 115 determines weighted densities of the bins using a maximum number of data records associated with a bin and a maximum data record limit of the bin. Binning of the data records and determining weighted densities are described in greater detail with an example in FIG. 2. Furthermore, the randomization component 120 renders the weighted densities of the bins on the graph using the randomization technique such as, but not limited to, a sampling technique and a simulation technique. Since the data records are grouped into bins and the bin's weighted densities are presented, the large volume of data records can be visualized on the GUI legibly without fetching actual data records from the database 105. An exemplary rendered graph is described in FIG. 3.

In one embodiment, the user can drill down to visualize granular view of the data records by selecting desired bin in the rendered graph. As the user selects a bin, the range of data records associated with the selected bin is further passed to binning component 115 to group the data records within that range into bins and to determine weighted densities of the bins. Further, the weighted densities are presented on the graph. In one embodiment, the user can drill down the bin until the user reaches either the maximum data record limit of the graph or when a bin size is reduced to one. In that case, actual data records are retrieved from the database 105 and plotted on the graph. Drilling down the bin to present data records is described with an example in FIG. 4.

Figure 2:
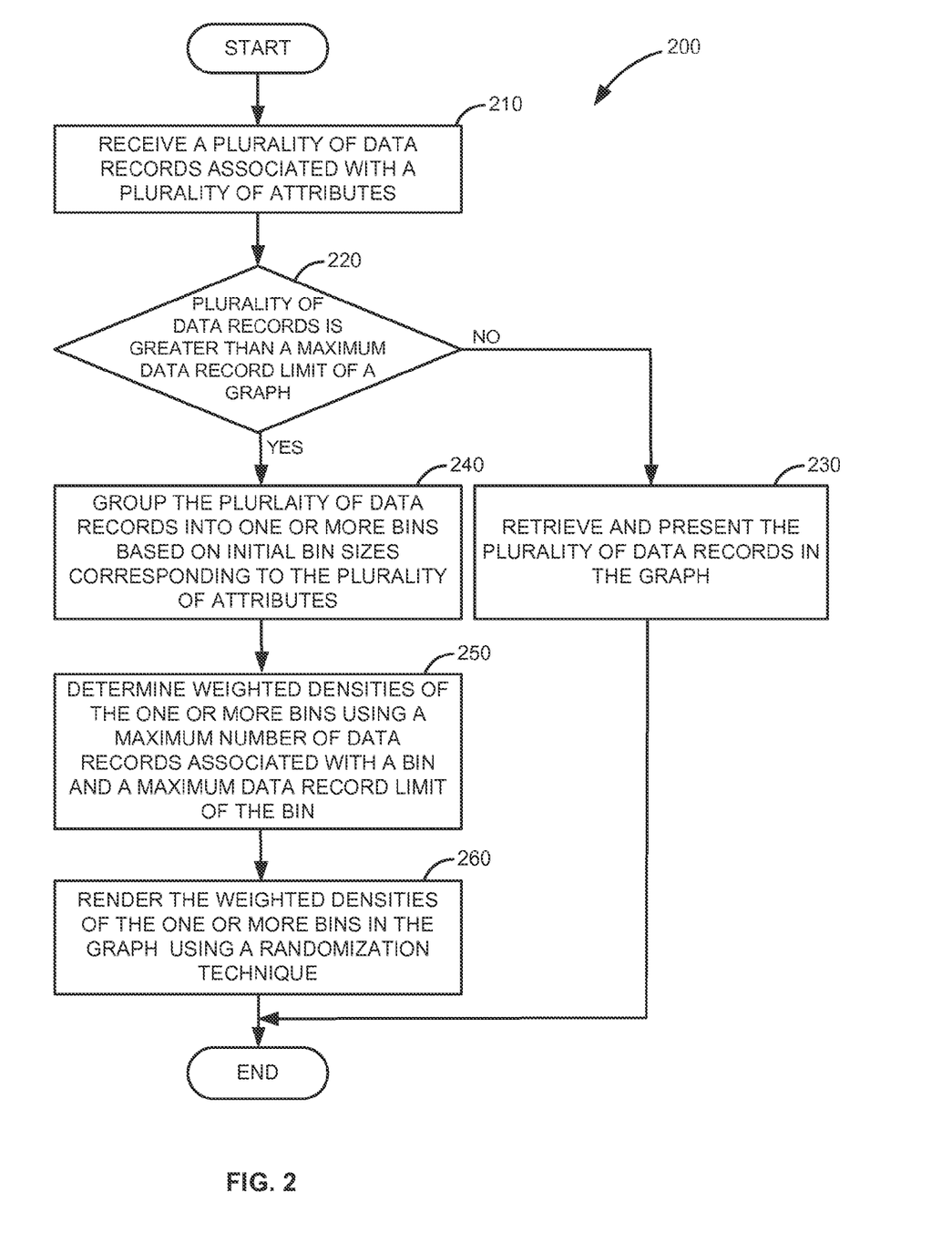
FIG. 2 is a flow diagram illustrating a method to present data records, according to an embodiment.

FIG. 2 is a flow diagram 200 illustrating a method to present data records, according to an embodiment. At step 210, a plurality of data records associated with a plurality of attributes are received. For example, the data records associated with two attributes (e.g., 'wealth' and 'income') as depicted in Table 1 are received.

TABLE 1

| Wealth | Income |
|--------|--------|
| 10 | 20 |
| 30 | 10 |
| 40 | 60 |
| 30 | 50 |
| . | . |
| . | . |
| . | . |
| 50 | 90 |
| 50 | 100 |
| 50 | 40 |
| 40 | 30 |
| 50 | 50 |
| 10 | 80 |

Table 1 depicts example data records of the attributes 'wealth' and 'income'. However, for describing the method of presenting a large volume of data records, Table 1 is considered to include 103103 data records.

At step 220, a check is made to determine whether the plurality of data records is greater than a maximum data record limit of a graph. In one exemplary embodiment, the maximum data record limit of the graph is provided by a user based on whether the user desires to view a high level view of the data records or a granular view of the data records. In another exemplary embodiment, the maximum data record limit of the graph can be automatically determined based on a screen capacity. For example, the maximum data record limit of the graph is considered as 50000. At step 230, when the data records is less than or equal to the maximum data record limit of the graph, the data records are retrieved from a database and are plotted in the graph. In the example, the received data records (e.g., 103103 data records) are greater than the maximum data record limit of the graph (e.g., 50000 data records).

At step 240, when the plurality of data records is greater than the maximum data record limit of the graph, the data records are grouped into one or more bins based on initial bin sizes corresponding to the plurality of attributes (A). In one embodiment, the initial bin sizes ($BS_0$) are determined using minimum attribute values ($mV(A)$) and maximum attribute values ($MV(A)$) of the plurality of attributes, and an initial number of bins ($N_0(A)$). In one embodiment, the initial bin size is proportional to the difference between the maximum attribute value and the minimum attribute value and inversely proportional to the initial number of bins. In one embodiment, the initial bin size is as shown in Equation (1). In one exemplary embodiment, the user is provided an option to input the initial number of bins corresponding to the attribute.

$$BS_0(A) = ((MV(A) - mV(A))/N_0(A)) + 1 \qquad (1)$$

For example, to determine the initial bin size of the attribute 'wealth', the minimum attribute value (e.g., 10 from Table 1) and the maximum attribute value (e.g., 50 from Table 1) are considered. Further, consider the initial number of bins corresponding to the 'wealth' as 5. Therefore, the initial bin size of the attribute 'wealth' $BS_0$(wealth) is determined as shown in Equation (2).

$$BS_0(\text{wealth}) = ((50-10)/5) + 1 = 9 \qquad (2)$$

Similarly, to determine the initial bin size of the attribute 'income', the minimum attribute value (e.g., 10) and the maximum attribute value (e.g., 100) are considered. Further, consider the initial number of bins corresponding to the 'income' as 10. Therefore, the initial bin size of the attribute 'income' $BS_0$(income) is determined as shown in Equation (3).

$$BS_0(\text{income}) = ((100-10)/10) + 1 = 10 \qquad (3)$$

Further, the data records are grouped into bins based on the initial bin sizes as shown in Table 2.

TABLE 2

| Wealth | Income | Number of data records in each bin | Wealth bin | Income bin |
|--------|--------|-----------------------------------|------------|------------|
| 10 | 20 | 25000 | 0 | 1 |
| 30 | 10 | 3000 | 2 | 0 |
| 40 | 60 | 2600 | 3 | 5 |
| 30 | 50 | 4000 | 2 | 4 |
| 50 | 90 | 1000 | 4 | 8 |
| 50 | 100 | 6000 | 4 | 9 |
| 50 | 40 | 55000 | 4 | 3 |
| 40 | 30 | 3 | 3 | 2 |
| 50 | 50 | 4500 | 4 | 4 |
| 10 | 80 | 2000 | 0 | 7 |

Therefore, the data records having attribute 'wealth' value as 10 is grouped in 'wealth' bin 0 and attribute 'income' value as 20 is grouped in 'income' bin 1. Similarly, the data records are grouped into the bins as depicted in Table 2. Further, since there are 103103 data records, the number of data records in each bin (i.e., density of the bins) is depicted in Table 2. Each bin represents the count (i.e., number of data records within that range) of data records and not the real data record.

At step 250, weighted densities of the one or more bins are determined using a maximum number of data records associated with a bin and a maximum data record limit of the bin. In the example, the maximum number of data records associated with the bin is 55000 (e.g., 'wealth' bin 4 and 'income' bin 3, represented as (4, 3)) and the maximum data record limit of the bin (MDL(B)) is determined by a function of the maximum data record limit of the graph (MDL(G)) and a total number of bins in the graph (TB(G)). In one embodiment, the maximum data record limit of the bin is proportional to the maximum data record limit of the graph and inversely proportional to the total number of bins in the graph. In one embodiment, the maximum data record limit of the bin is as shown in Equation (4).

$$MDL(B)=MDL(G)/TB(G) \qquad (4)$$

Since the number of bins corresponding to the 'wealth' and the 'income' are considered as 5 and 10 respectively, the total number of bins in the graph is (5×10), i.e., 50 bins. Further, the maximum data record limit of the bin (MDL(B)) is determined as shown in Equation (5).

$$MDL(B)=50000/50=1000 \qquad (5)$$

Further, the weighted densities of the bins are determined using Equation (6). In one embodiment, the weighted densities of the bin (WD(B)) is proportional to the number of data records in the bin (ND(B)) and the maximum data record limit of the bin (MDL(B)) and inversely proportional to the maximum number of data records associated with the bin (MD(B)).

$$WD(B)=ND(B) \times MDL(B)/MD(B) \qquad (6)$$

The weighted densities of the bins are determined using the Equation (6) and is depicted in Table 3.

TABLE 3

| Wealth | Income | Number of data records in each bin | Wealth bin | Income bin | Weighted Density |
|---|---|---|---|---|---|
| 10 | 20 | 25000 | 0 | 1 | 455 |
| 30 | 10 | 3000 | 2 | 0 | 55 |
| 40 | 60 | 2600 | 3 | 5 | 47 |
| 30 | 50 | 4000 | 2 | 4 | 73 |
| 50 | 90 | 1000 | 4 | 8 | 18 |
| 50 | 100 | 6000 | 4 | 9 | 109 |
| 50 | 40 | 55000 | 4 | 3 | 1000 |
| 40 | 30 | 3 | 3 | 2 | 0.05 |
| 50 | 50 | 4500 | 4 | 4 | 82 |
| 10 | 80 | 2000 | 0 | 7 | 36 |

Figure 3:
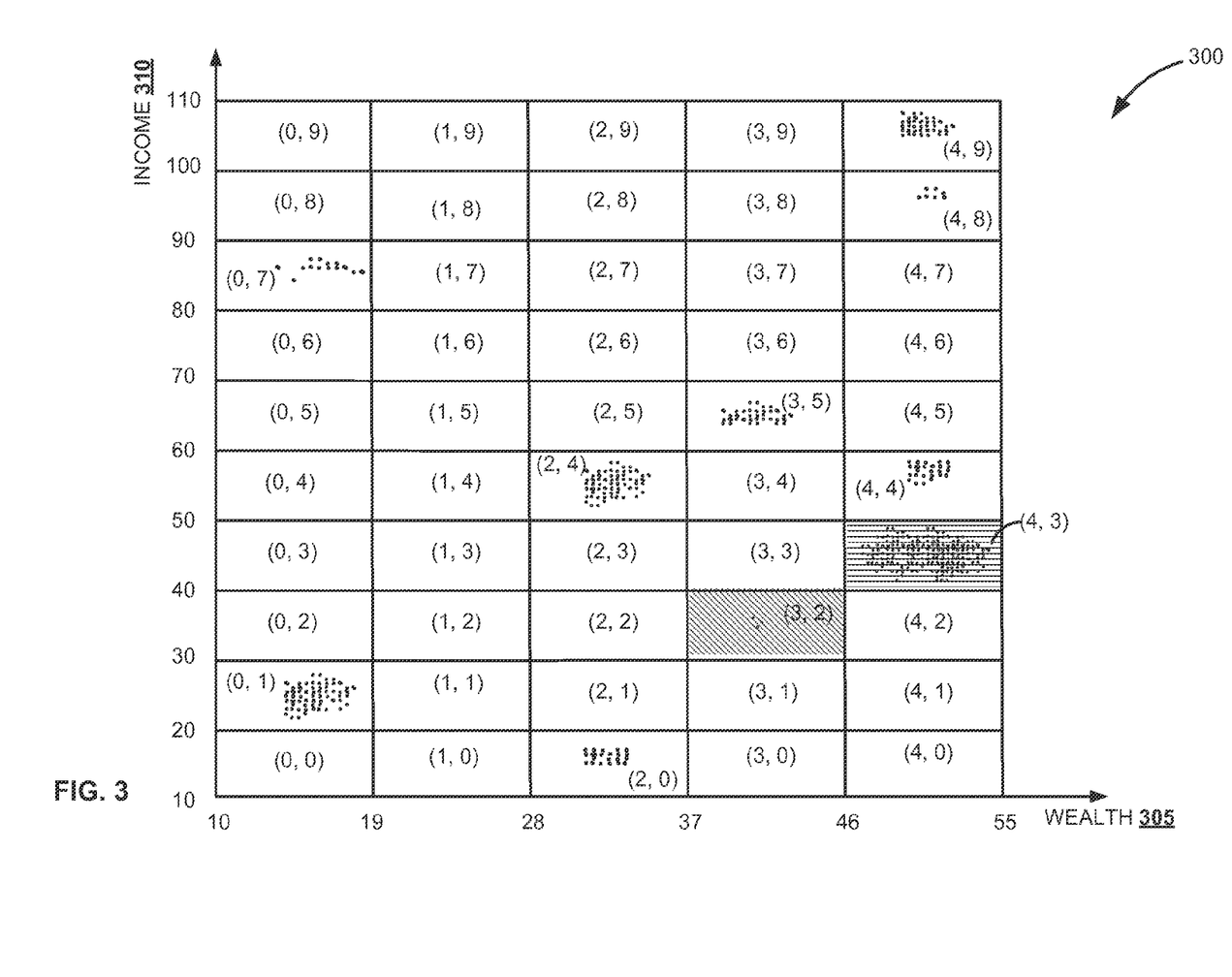
FIG. 3 is an exemplary rendered graph illustrating step 260 of FIG. 2, according to an embodiment.

At step 260, the weighted densities of the one or more bins are rendered in the graph using a randomization technique. In one exemplary embodiment, the randomization technique includes a technique selected from a group consisting of a simulation technique and a sampling technique. In the simulation technique, random points corresponding to the weighted densities of the bins are plotted in the graph as shown in FIG. 3. The simulation technique can be used if a database is a conventional database, where data records are stored using a disk storage mechanism. FIG. 3 illustrates an exemplary rendered graph 300 using the simulation technique. For example, the rendered graph 300 is a scatter graph. The scatter graph 300 or scatter chart or scatter diagram or two-dimensional histogram or co-occurrence matrix uses Cartesian coordinates to display data record points. In one exemplary embodiment, the attributes are represented by a plurality of axes of the graph. The x-axis of the scatter graph 300 represents 'wealth' 305 and y-axis of the scatter graph represents 'income' 310.

In one embodiment, the weighted densities as depicted in Table 3 are plotted in the scatter graph 300 as a number of representative points in the bins (e.g., (0, 0), (0, 1) . . . (5, 9) (5, 10)). Random points corresponding to the weighted densities of the bins are plotted in respective bins. Further, colors, shading or symbols may be used to represent the weighted densities of the bins. The bin (4, 3) having highest weightage is represented with more dots compared to other bins. Similarly, bin (3, 2) having least weightage is represented with few dots. Further, the bin (2, 2) is empty as there are no data records in the database within that range. The advantage of using the simulation technique is, without fetching the data records from an underlying database, entire data record points can be analyzed.

In another exemplary embodiment, the weighted densities can be represented on the graph using the sampling technique. In sampling technique, instead of plotting random plots in the bins, a random set of data records or a normalized data records (e.g., data records associated with a regular interval) are plotted in the graph. The sampling technique can be used if the database is an in-memory database, where the data records are stored in main physical memory of a computer system. The advantage of using the sampling technique is, only a few data records are fetched from the underlying database and yet provides the view of the entire data records. Further, the user can drill down the rendered graph to view data records associated with a bin, which is described in greater detail in FIG. 4.

Figure 4:
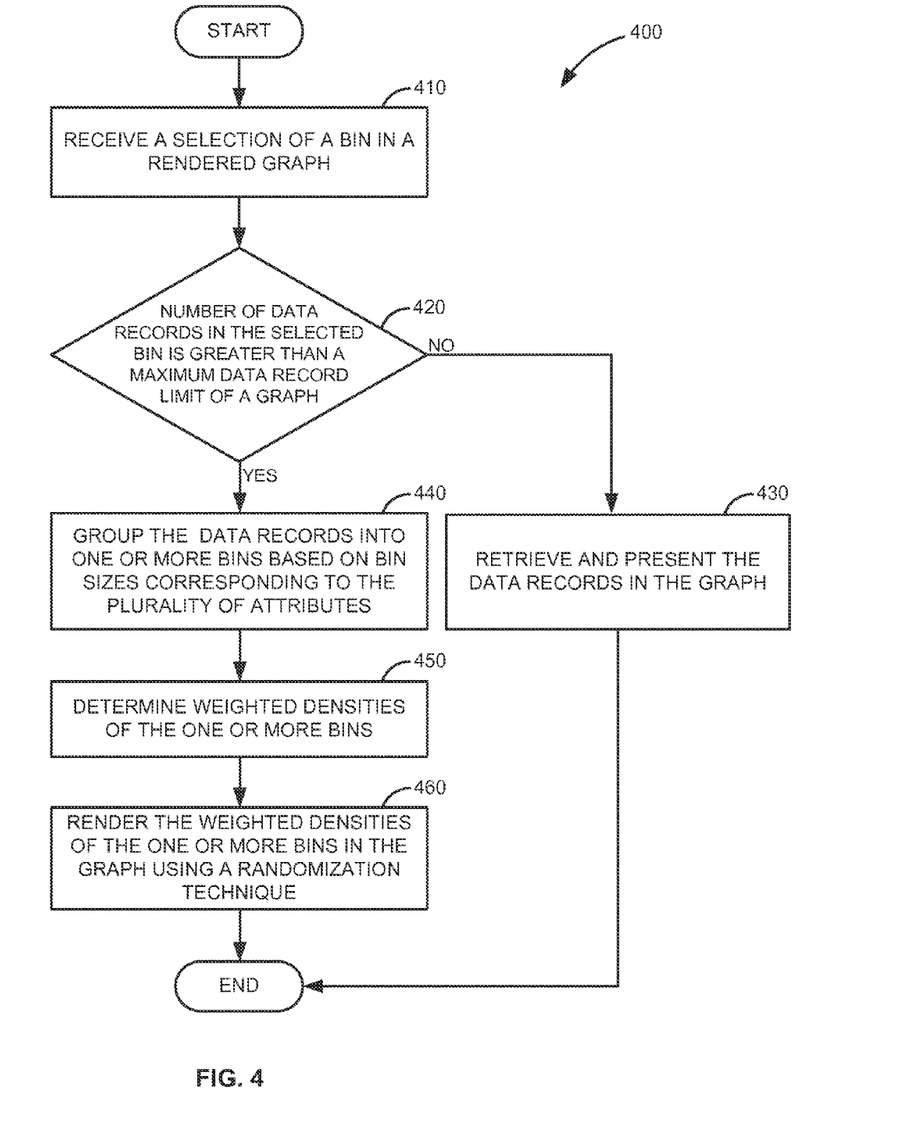
FIG. 4 is a flow diagram illustrating a method to present data records in a selected bin, according to an embodiment.

FIG. 4 is a flow diagram 400 illustrating a method to present data records in a selected bin, according to an embodiment. A user can desire to view the data records associated with a bin. At step 410, selection of the bin in the rendered graph is received. The bin can be selected by a user action such as double clicking the desired bin and the like. For example, bin (3, 2) of the rendered graph 300 of FIG. 3 is selected. At step 420, a check is made to determine whether a number of data records in the selected bin is greater than a maximum data record limit of a graph. In the example, the bin (3, 2) includes three data records and the maximum data record limit of the graph is considered as 50,000.

Figure 5:
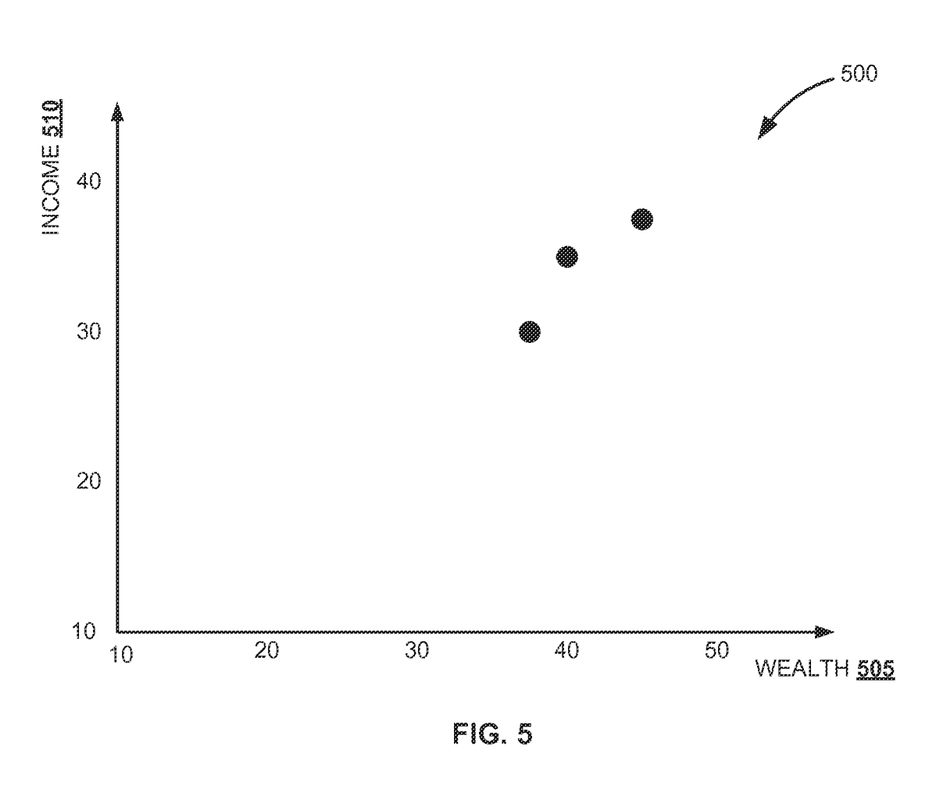
FIG. 5 is an exemplary graph illustrating step 430 of FIG. 4, according to an embodiment.

At step 430, when the number of data records in the selected bin is less than or equal to the maximum data record limit of the graph, the data records associated with the selected bin are retrieved and are presented in the graph. In the example, the number of data records in the selected bin is less than the maximum data record limit of the graph. Therefore, the actual data records are presented in the graph as shown in FIG. 5. FIG. 5 illustrates an exemplary graph 500 presenting data records of the selected bin. For example, the graph 500 is a scatter graph. The x-axis of the scatter graph 500 represents 'wealth' 505 and y-axis of the scatter graph represents 'income' 510. Further, the data records in the selected bin (3, 2) as depicted in Table 4 are plotted in the graph 500.

TABLE 4

| Wealth | Income |
|---|---|
| 38 | 30 |
| 40 | 35 |
| 45 | 39 |

In another example, bin (4, 3) of FIG. 3 is selected. The bin (4, 3) includes 55000 data records, which is greater than the maximum data record limit of the graph (e.g., 50000 data records). At step 440, when the number of data records in the selected bin is greater than the maximum data record limit of the graph, data records associated with the selected bin are grouped into one or more bins based on bin sizes corresponding to the plurality of attributes. The bin size corresponding to the attributes are determined as follows. When an initial bin size of the attribute is greater than an initial number of bins corresponding to the attribute, then the bin size of the attribute is equal to the initial bin size of the attribute. Further, when the initial bin size of the attribute is less than or equal to the initial number of bins corresponding to the attribute, number of bins corresponding to the attribute is equal to the initial bin size. Then, the bin size is determined using the maximum attribute value, minimum attribute value and the number of bins corresponding to the attribute. In one embodiment, the bin size (BS) is proportional to the difference between the maximum attribute value (MV(A)) and the minimum attribute value (mV(A)) and inversely proportional to the number of bins corresponding to the attribute (N(A)).

$$BS(A)=((MV(A)-mV(A))/N(A))+1 \quad (7)$$

For example, to determine the bin size of the attribute 'wealth' representing x-axis of the graph, the initial bin size (e.g., 9) and the initial number of bins (e.g., 5) corresponding to the attribute 'wealth' is considered. Since the initial bin size (e.g., 9) is greater than the initial number of bins (e.g., 5) corresponding to the attribute 'wealth', the bin size of the attribute 'wealth' is equal to the initial bin size of the attribute 'weight' (e.g., 9).

Further, to determine the bin size of the attribute 'income' representing y-axis of the graph, the initial bin size (e.g., 10) and the initial number of bins (e.g., 10) corresponding to the attribute 'income' is considered. Since the initial bin size (e.g., 10) is same as the initial number of bins (e.g., 10) corresponding to the attribute 'income', the number of bins corresponding to the attribute 'income' is equal to the initial bin size of the attribute 'income' (e.g., 10). Further, the bin size of the attribute 'income' BS(income) is determined using the Equation (7) by considering the minimum attribute value (e.g., 40) and the maximum attribute value (e.g., 49) of the selected bin (4, 3) as shown in Equation (8).

$$BS(income)=((49-40)/10))+1=2 \quad (8)$$

Further, the data records associated with the selected bin (4, 3) are grouped into bins based on the bin sizes corresponding to the attributes. At step 450, weighted densities of the one or more bins are determined as described in FIG. 2. At step 460, the weighted densities of the one or more bins are rendered in the graph using a randomization technique as described in FIG. 3. Further, the user can drill down the bin until the user reaches either the maximum data record limit of the graph or the bin size is reduced to one to visualize the data records. In one embodiment, at any instance, user can go back and forth to analyze the data records. In other words, the user can drill down the selected range and view the data records in minute detail and can come back to the macro view again. Thus, the user can interact with the graph using the forward and backward actions and can view the frequency of data records in each level. Therefore, in large data records visualization, entire data is not copied locally to the system, rather is distributed into bins with efficient binning logic and only the bins and the corresponding frequencies (i.e., count) are being brought to the system locally, providing the macro and micro view of data.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface (GUI)). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 6:
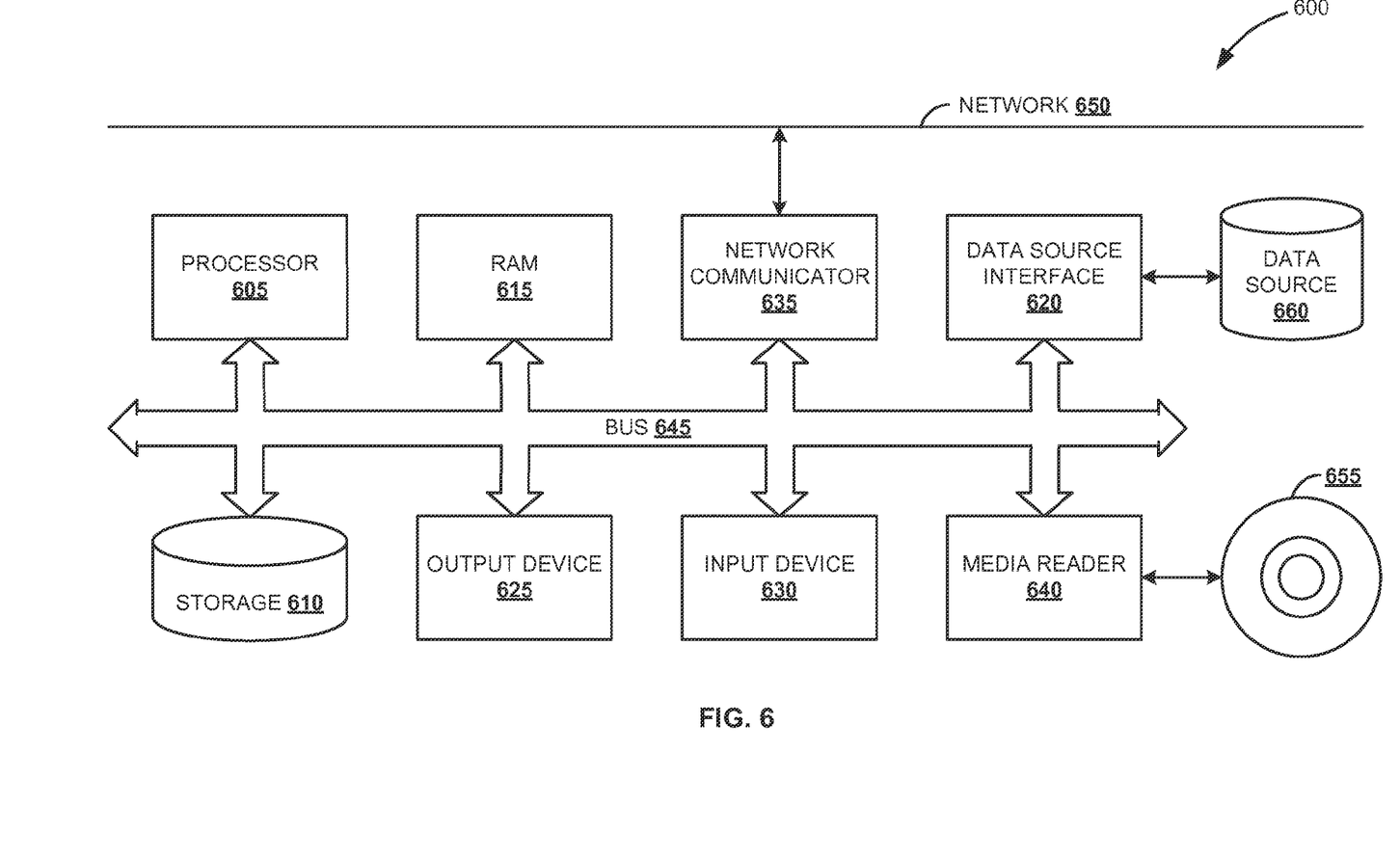
FIG. 6 is a block diagram of an exemplary computer system, according to an embodiment.

FIG. 6 is a block diagram of an exemplary computer system 600, according to an embodiment. The computer system 600 includes a processor 605 that executes software instructions or code stored on a computer readable storage medium 655 to perform the above-illustrated methods. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. The stored instructions may be further compiled to generate other representations of the instructions and dynamically stored in the RAM 615. The processor 605 reads instructions from the RAM 615 and performs actions as instructed. According to one embodiment, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented in hardware or software. For example, the data source 660 may be accessed by network 650. In some embodiments the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data sources accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, are described herein for illustrative purposes, various equivalent modifications are possible within the scope of the one or more embodiments, as those skilled in the relevant art will recognize. These modifications can be made in light of the above detailed description. Rather, the scope is to be determined by the following claims, which are to be interpreted in accordance with established doctrines of claim construction.

What is claimed is:

1. An article of manufacture including a non-transitory computer readable storage medium to store instructions, which when executed by a computer, cause the computer to:
   receive a plurality of data records associated with a plurality of attributes;
   determine whether a count of the plurality of data records is greater than a maximum data record limit of a graph;
   when the count of the plurality of data records is greater than the maximum data record limit of the graph, group the plurality of data records into a plurality of bins based on initial bin sizes, wherein the initial bin sizes correspond to values of the plurality of attributes;
   determine weighted densities of the plurality of bins, wherein a weighted density of a bin of the plurality of bins is determined based on a maximum number of data records associated with the bin, a number of data records in the bin, and a maximum data record limit of the bin; and
   render the weighted densities of the plurality of bins on the graph using a randomization technique.

2. The article of manufacture of claim 1, wherein when the count of the plurality of data records is less than or equal to the maximum data record limit of the graph, retrieve and present the plurality of data records in the graph.

3. The article of manufacture of claim 1, further comprising instructions, which when executed by the computer, cause the computer to:
   receive a selection of a bin in the rendered graph;
   determine whether a count of data records in the selected bin is less than or equal to the maximum data record limit of the graph; and
   when the count of data records in the selected bin is less than or equal to the maximum data record limit of the graph, retrieve and present data records associated with the selected bin in the graph.

4. The article of manufacture of claim 3, wherein when the count of data records in the selected bin is greater than the maximum data record limit of the graph:
   group data records associated with the selected bin into a plurality of bins based on bin sizes corresponding to the plurality of attributes, wherein the bin sizes are determined based on the initial bin sizes;
   determine weighted densities of the plurality of bins corresponding to the selected bin based on the maximum number of data records associated with a bin, a number of data records in the bin, and the maximum data record limit of the bin; and
   render the weighted densities of the plurality of bins corresponding to the selected bin on the graph using the randomization technique.

5. The article of manufacture of claim 4, wherein determining the bin sizes further comprises:
   when an initial bin size of an attribute is greater than an initial number of bins corresponding to the attribute, a bin size of the attribute is equal to the initial bin size of the attribute, and
   when the initial bin size of the attribute is less than or equal to the initial number of bins corresponding to the attribute, the bin size is determined using a maximum attribute value, a minimum attribute value and a number of bins corresponding to the attribute.

6. The article of manufacture of claim 1, wherein the plurality of attributes is represented by a plurality of axes of the graph.

7. The article of manufacture of claim 1, wherein the initial bin sizes are determined using minimum attribute values and maximum attribute values of the plurality of attributes, and a total number of bins corresponding to the graph.

8. The article of manufacture of claim 1, wherein the maximum data record limit of the bin is determined by a function of the maximum data record limit of the graph and a total number of bins in the graph.

9. The article of manufacture of claim 1, wherein the weighted density of the bin is inversely proportional to the maximum number of data records associated with the bin.

10. A computer implemented method to present a plurality of data records, the method comprising:
   receiving the plurality of data records associated with a plurality of attributes;

a computer, determining whether a count of the plurality of data records is greater than a maximum data record limit of a graph;

when the count of the plurality of data records is greater than the maximum data record limit of the graph, grouping the plurality of data records into a plurality of bins based on initial bin sizes, wherein the initial bin sizes correspond to values of the plurality of attributes;

the computer, determining weighted densities of the of bins, wherein a weighted density of a bin of the plurality of bins is determined based on a maximum number of data records associated with the bin, a number of data records in the bin, and a maximum data record limit of the bin; and rendering the weighted densities of the plurality of bins on the graph using a randomization technique.

11. The computer implemented method of claim 10, wherein when the count of the plurality of data records is less than or equal to the maximum data record limit of the graph, retrieve and present the plurality of data records in the graph.

12. The computer implemented method of claim 10, further comprising:

receiving a selection of a bin in the rendered graph;

determining whether a count of data records in the selected bin is less than or equal to the maximum data record limit of the graph; and when the number of data records in the selected bin is less than or equal to the maximum data record limit of the graph, retrieving and presenting data records associated with the selected bin in the graph.

13. The computer implemented method of claim 12, wherein when the count of data records in the selected bin is greater than the maximum data record limit of the graph:

group data records associated with the selected bin into a plurality of bins based on bin sizes corresponding to the plurality of attributes, wherein the bin sizes are determined based on the initial bin sizes;

determine weighted densities of the plurality of bins corresponding to the selected bin based on the maximum number of data records associated with a bin, a number of data records in the bin, and the maximum data record limit of the bin; and render the weighted densities of the plurality of bins corresponding to the selected bin on the graph using the randomization technique.

14. The computer implemented method of claim 10, wherein the initial bin sizes are determined using minimum attribute values and maximum attribute values of the plurality of attributes, and a total number of bins corresponding to the graph.

15. The computer implemented method of claim 10, wherein the randomization technique comprises a technique selected from a group consisting of a simulation technique and a sampling technique.

16. The computer implemented method of claim 10, wherein the maximum data record limit of the bin is determined by a function of the maximum data record limit of the graph and a total number of bins in the graph.

17. A computer system to present a plurality of data records, the computer system comprising:

at least one processor; and one or more memory devices communicative with the at least one processor, wherein the one or more memory devices store instructions to:

receive the plurality of data records associated with a plurality of attributes;

determine whether a count of the plurality of data records is greater than a maximum data record limit of a graph;

when the count of the plurality of data records is greater than the maximum data record limit of the graph, group the plurality of data records into a plurality of bins based on initial bin sizes, wherein the initial bin sizes correspond to values of the plurality of attributes;

determine weighted densities of the plurality of bins, wherein a weighted density of a bin of the plurality of bins is determined based on a maximum number of data records associated with the bin, a number of data records in the bin, and a maximum data record limit of the bin; and render the weighted densities of the plurality of bins on the graph using a randomization technique.

18. The computer system of claim 17, wherein when the count of the plurality of data records is less than or equal to the maximum data record limit of the graph, retrieve and present the plurality of data records in the graph.

19. The computer system of claim 17, further comprising instructions to:

receive a selection of a bin in the rendered graph;

determine whether a count of data records in the selected bin is less than or equal to the maximum data record limit of the graph; and when the count of data records in the selected bin is less than or equal to the maximum data record limit of the graph, retrieve and present data records associated with the selected bin in the graph.

20. The computer system of claim 19, wherein when the count of data records in the selected bin is greater than the maximum data record limit of the graph:

group data records associated with the selected bin into a plurality of bins based on bin sizes corresponding to the plurality of attributes, wherein the bin sizes are determined based on the initial bin sizes;

determine weighted densities of the plurality of bins corresponding to the selected bin based on the maximum number of data records associated with a bin, a number of records in the bin, and the maximum data record limit of the bin; and render the weighted densities of the plurality of bins on the graph using the randomization technique.

* * * * *